April 15, 1924.  
J. J. H. STURMEY ET AL  
1,490,644  
FIVE-SPEED GEAR FOR BICYCLES AND MACHINERY  
Filed July 10, 1922  7 Sheets-Sheet 2
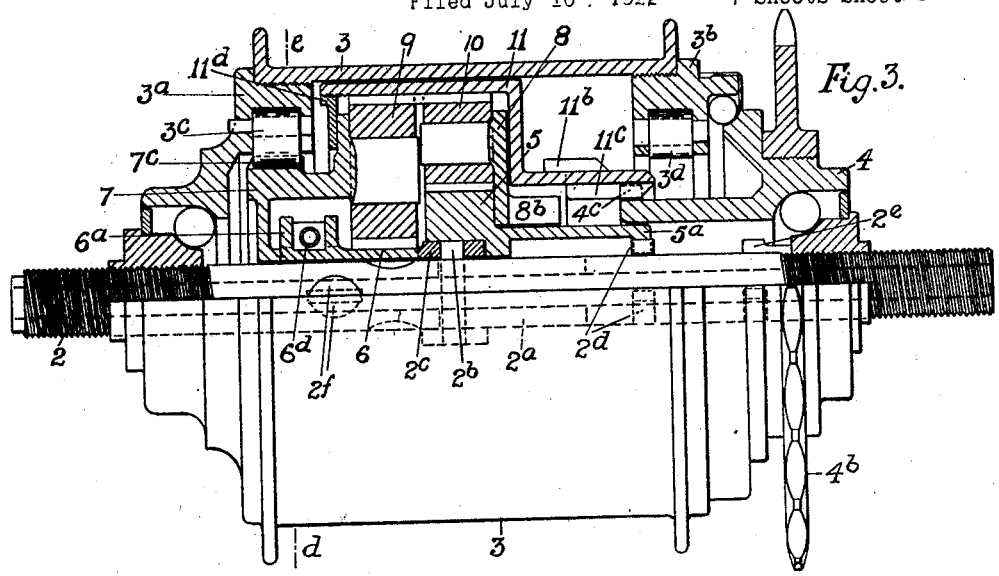
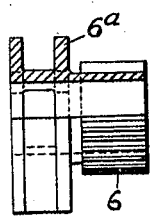
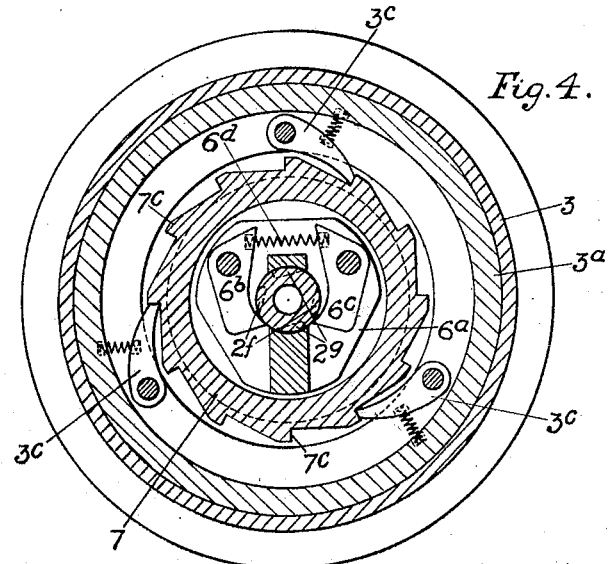
Inventors.  
John James Henry Sturmey.  
William John Peart.  
per. J. Fletcher Wilson.  
Attorney.

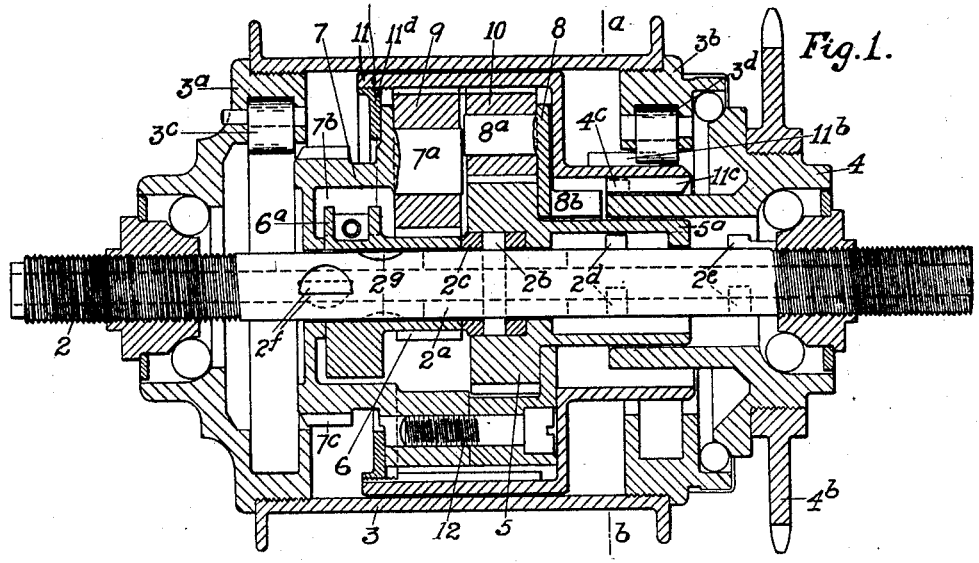

April 15, 1924.
J. J. H. STURMEY ET AL
1,490,644
FIVE-SPEED GEAR FOR BICYCLES AND MACHINERY
Filed July 10, 1922     7 Sheets-Sheet 3
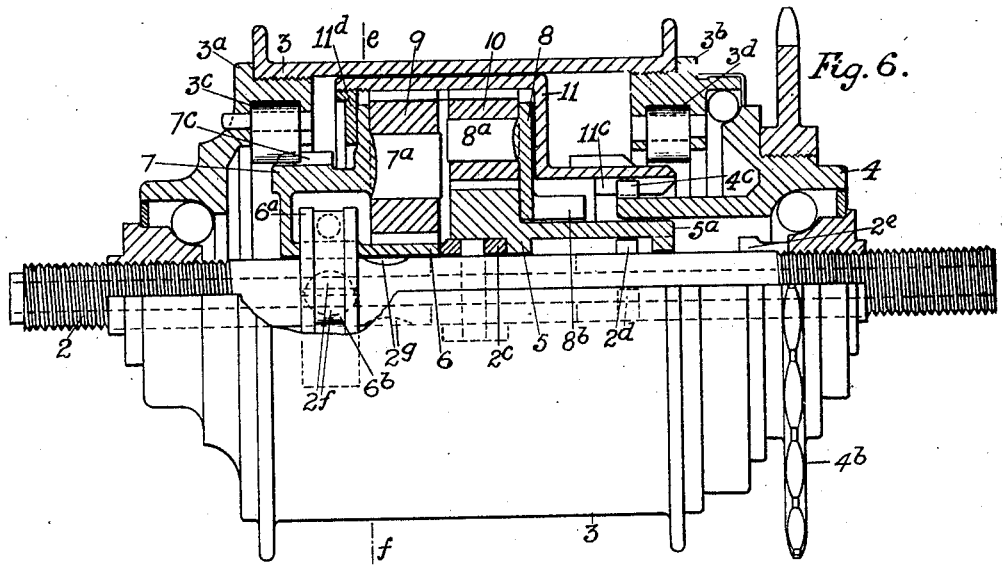
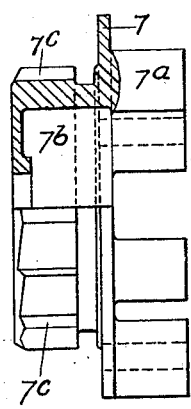
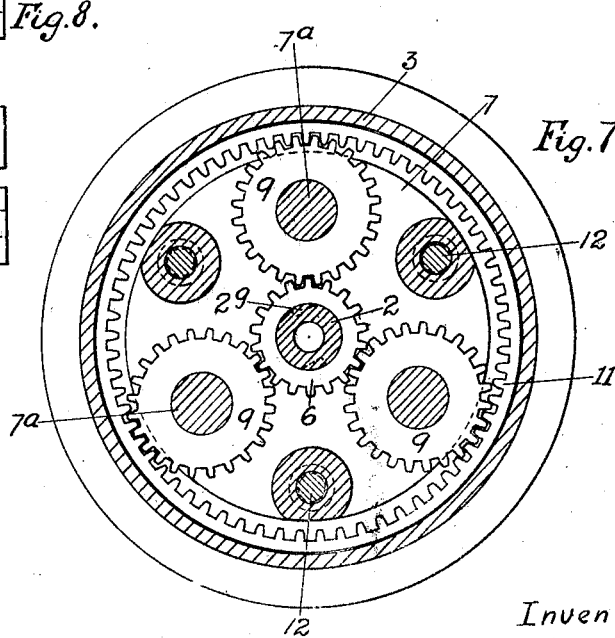
Inventors.
John James Henry Sturmey.
William John Peart.
per J. Fletcher Wilson
Attorney.

April 15, 1924.  
J. J. H. STURMEY ET AL  
1,490,644  
FIVE-SPEED GEAR FOR BICYCLES AND MACHINERY  
Filed July 10, 1922  
7 Sheets-Sheet 4

Inventors.  
John James Henry Sturmey.  
William John Peart.  
per J. Fletcher Wilson.  
Attorney.

April 15, 1924.

J. J. H. STURMEY ET AL 1,490,644

FIVE-SPEED GEAR FOR BICYCLES AND MACHINERY

Filed July 10, 1922  7 Sheets-Sheet 5

Inventors.
John James Henry Sturmey.
William John Peart.
per J. Fletcher Wilson.
Attorney.

April 15, 1924.
J. J. H. STURMEY ET AL
1,490,644
FIVE-SPEED GEAR FOR BICYCLES AND MACHINERY
Filed July 10, 1922   7 Sheets-Sheet 6
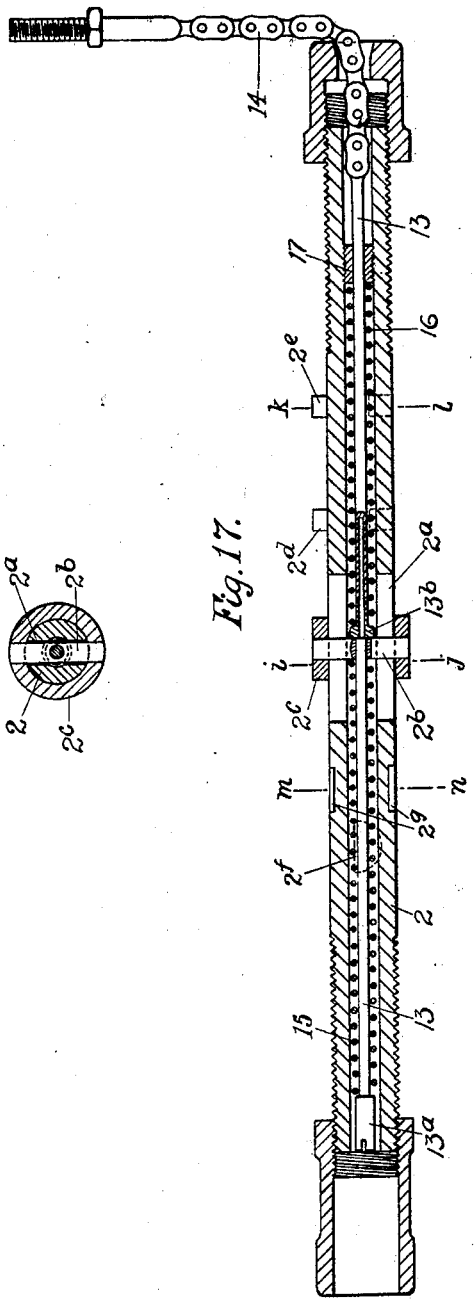
Inventors.
John James Henry Sturmey.
William John Peart.
per J. Fletcher Wilson.
Attorney.

April 15, 1924.
J. J. H. STURMEY ET AL
1,490,644
FIVE-SPEED GEAR FOR BICYCLES AND MACHINERY
Filed July. 10, 1922   7 Sheets-Sheet 7
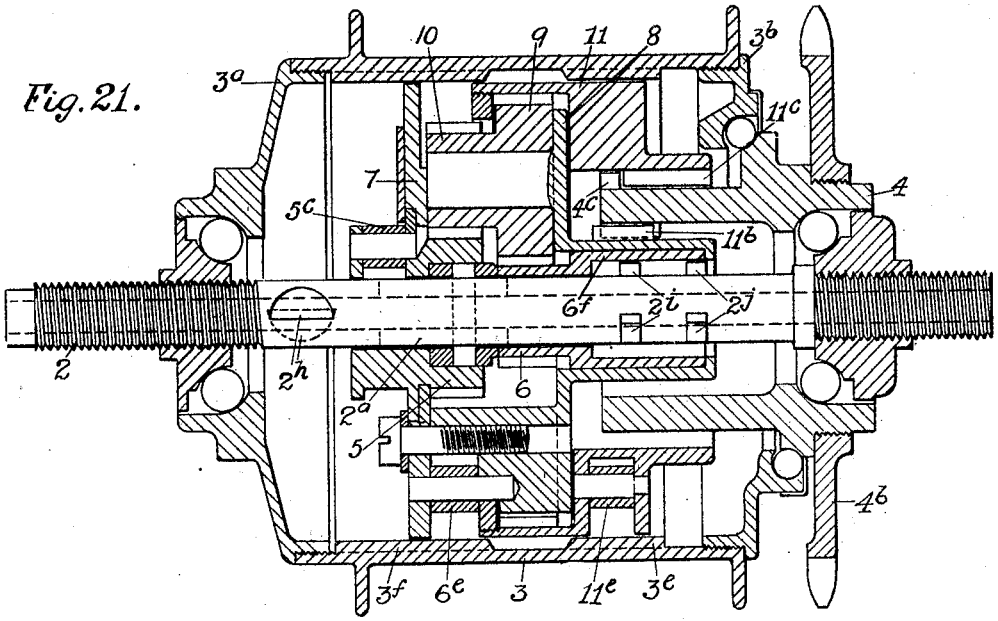
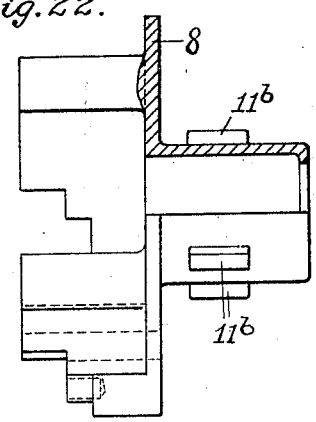
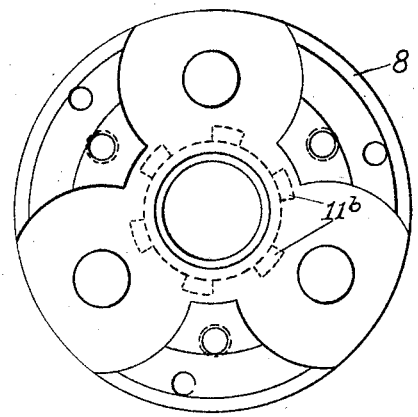
Inventors.
John James Henry Sturmey.
William John Peart.
per J Fletcher Wilson.
Attorney.

Patented Apr. 15, 1924.

1,490,644

UNITED STATES PATENT OFFICE.

JOHN JAMES HENRY STURMEY AND WILLIAM JOHN PEART, OF COVENTRY, ENGLAND.

FIVE-SPEED GEAR FOR BICYCLES AND MACHINERY.

Application filed July 10, 1922. Serial No. 574,065.

*To all whom it may concern:*

Be it known that we, JOHN JAMES HENRY STURMEY and WILLIAM JOHN PEART, subjects of the King of Great Britain, residing, respectively, at the Quarry Close, St. Nicholas Street, Coventry, in the county of Warwick, England, and 6 Melville Road, Coventry, in the county of Warwick, England, have invented new and useful Improvements in a Five-Speed Gear for Bicycles and Machinery, of which the following is a specification.

The purpose of the present invention is to provide a gear primarily for use on bicycles, in which five speeds or gear ratios are embodied. Three speeds have been embodied in bicycle hubs for many years in which epicyclic trains are employed so arranged as to provide one gear reduction and one gear multiplication in addition to an intermediate or directly driven normal and have achieved considerable popularity. But the range of such gears is limited and it is found that whilst under specially favourable road conditions a still higher gear than that obtained by working through the multiplying gear could be advantageously driven, hills of more than ordinary severity still entail undue work and a still lower ratio than that given by the reducing gear would be welcome and it is the object of our invention to remedy these defects by providing an extra-high and an extra-low gear additional to the usual three.

In the usual three speed gears a single epicyclic gear is employed so constructed that the resistance in the drive is taken by the sun wheel which is a fixture on the supporting axle.

In order to effect the purpose of the present invention two sun wheels of different diameters are employed in combination with either compound, i. e., double planet pinions, or two separate pinions of different diameters, and a common annulus, the said sun wheels being loose and mounted slidably upon the usual hollow axle in which the operating device is carried.

The respective sun wheels may be held or locked to the axle and the planet member and annulus to the driving sprocket and the hub shell or driven member respectively as required in any suitable manner as by means of sliding clutches, or, as is preferred, the complete gear comprising the sun wheels, planet pinions and annulus may be adapted to slide from end to end of the axle and so arranged that the requisite clutchings and declutchings with the required parts are made in the proper sequence in the course of its travel, the effect being that whilst the gearing is multiplied or reduced according to whether planet or annulus is driving or being driven, a different degree of either multiplication or reduction is obtained in accordance with which of the two sun wheels is engaged with the axle and which is loose.

In order that the invention may be clearly understood and readily carried into practical effect reference is made in describing the same to the accompanying drawings which shew the invention as applied to the hub of the driving road wheel of a bicycle.

Figure 1 represents a longitudinal sectional view of a bicycle hub incorporating the complete gear and shewing the gear block in the normal or third speed position.

Figure 2 is a transverse sectional view on the line $a$—$b$.

Figure 3 is a half-sectional view of the hub shewing the parts of the gear in the position they occupy for the first or lowest speed.

Figure 4 is a transverse sectional view of the same on the line $c$—$d$.

Figure 5 is a half-sectional view of the small sun wheel and pawl carrier.

Figure 6 is a half-sectional view of the hub shewing the parts of the gear in the position they occupy for the second speed.

Figure 7 is a cross-sectional view of the same on the line $e$—$f$.

Figure 8 is a half-sectional view of the left-hand portion of the planet carrier and its ratchet member.

Figure 17 is a longitudinal sectional view on a larger scale than the other figures of the axle shewing the gear actuating mechanism.

Figures 18, 19 and 20 are transverse sectional views of the same on the lines $i$—$j$, $k$—$l$ and $m$—$n$ respectively.

Figure 21 illustrates in longitudinal section a slightly modified construction of five-speed gear in which compound planet pinions are employed.

Figures 22 and 23 are half-sectional and end views respectively of the carrier for the compound planet pinions.

Throughout the drawings like parts are designated by similar reference characters.

Figure 9:
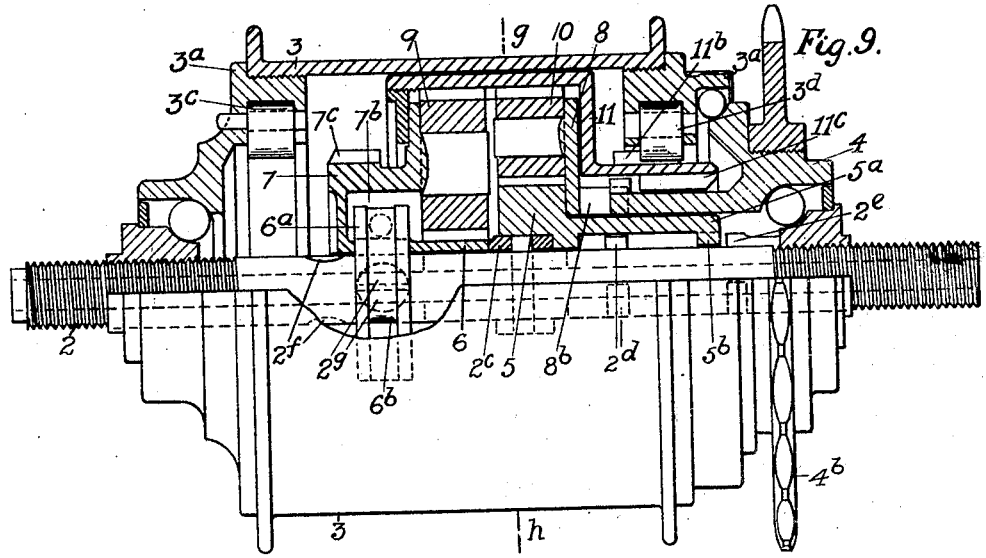
Figure 9 is a half-sectional view of the hub shewing the parts of the gear in the position they occupy for the fourth speed.
Figures 12, 13:
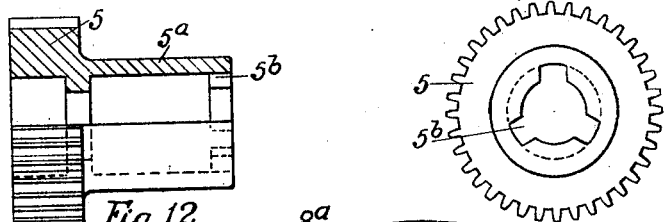
Figures 12 and 13 are detail half-sectional and end views respectively of the large sun wheel and its extension and clutch parts.
Figure 10:
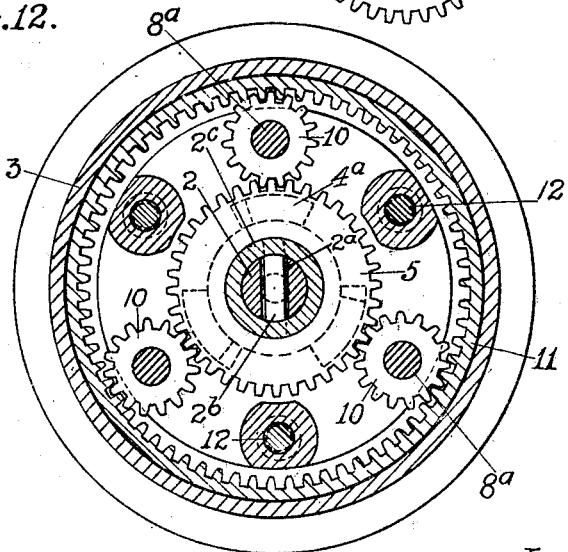
Figure 10 is a transverse sectional view of the same on the line $g$—$h$.
Figure 11:
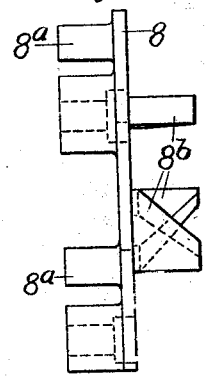
Figure 11 is a detail side view of the right hand portion of the planet carrier and its clutch members.
Figure 14:
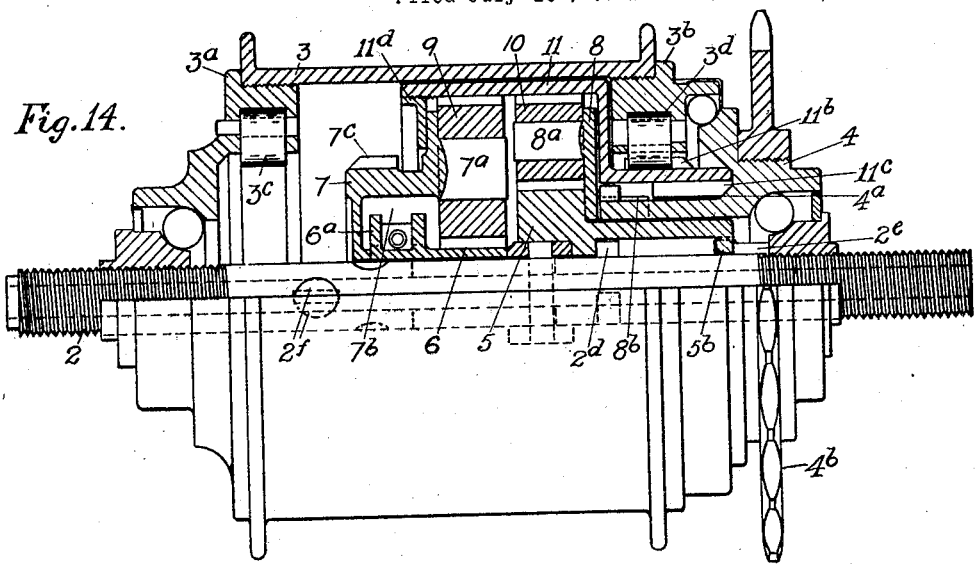
Figure 14 is a half-sectional view of the hub shewing the parts of the gear in the position they occupy for the fifth or highest speed.
Figure 15:
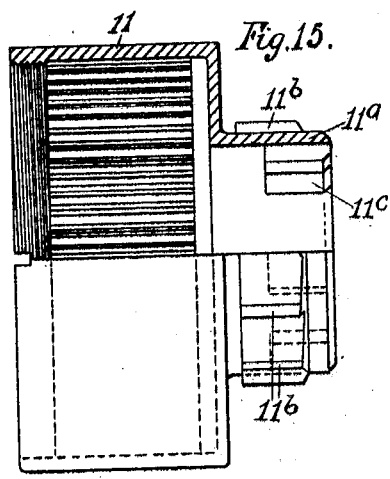
Figure 15 is a similar detail view of the annulus with its clutch and ratchet members.

Referring to the construction of gear shewn in Figures 1–19 the stationary tubular axle 2, shewn separately in Figure 17, is adapted to be fixed at each end in the frame of the machine and carries ball bearings on which the hub shell or driven member 3 and the driving or sprocket member 4 (see detail view Figure 16) are revolubly and independently mounted.

The axle 2 is provided at or about the centre of its length with a longitudinal slot $2^a$ to receive a gear actuating pin $2^b$ which carries a collar $2^c$ mounted so as to be free to slide on the axle in each direction to an extent limited by the hub.

The manner in which the pin and collar are moved to effect the various gear changes will be hereinafter described.

On one side of the collar $2^c$ the axle is formed or provided with two sets of dogs or clutch members, $2^d$, $2^e$, and at the other side of the said collar the axle is formed with two closely arranged but diametrically opposed pairs of recessed abutments $2^f$, $2^g$ one pair being also of opposite sense to the other, see Figures 4, 17 and 23.

The hub shell 3 is closed at each end by means of caps $3^a$, $3^b$ which are provided on the inside with a series of pawls $3^c$, $3^d$, see Figures 2 and 4, each of which series forms the driven part of a one-way clutch and enables the driver to free wheel or "coast" in any position of the gear.

The intermediate member of the gear by which the different speed ratios between the hub and driving sprocket are determined is arranged when assembled to move en bloc along the axle within the hub shell and comprises the large and small sun wheels 5, 6 which are both mounted loosely on and free to slide along the axle, a two-part carrier 7, 8 for the corresponding sets of large and small planet pinions 9, 10, and an annulus 11 (Figure 15) which is common to and in constant mesh with both sets of said pinions.

The large sun wheel 5, (Figures 12 and 13) as shewn, overhangs and abuts close up against the right hand side of the gear actuating collar $2^c$ and on the same side is provided with a sleeve or extension $5^a$ the bore of which is slightly greater than the outside diameter of the dogs or clutch members $2^d$, $2^e$ on the axle. At the end of this sleeve or extension inwardly directed clutch members $5^b$ are provided adapted for engagement with said dogs.

The small sun wheel 6 (Figure 5) abuts close up against the left hand side of the gear actuating collar $2^c$ and is provided with a pawl carrier $6^a$ which is open at the sides to receive two oppositely arranged pawls $6^b$, $6^c$ the free ends of which are normally held in contact with the axle by means of a spring $6^d$ which is common to both pawls, as will be seen more clearly in Figure 4. In certain positions of the gear one of these pawls alternately engages with one or other of the two pairs of recessed abutments $2^f$, $2^g$ in the axle.

The planet carrier is made in two parts 7, 8 (Figures 8 and 11) loosely mounted respectively on the axle and on the sleeve extension $5^a$ of the large sun wheel 5. Each part carries on its inside face a number of spindles $7^a$, $8^a$ upon which the planet pinions 9, 10 are mounted. The two parts are assembled from opposite ends of the axle and firmly secured together by screws 12. The left hand part 7 of the carrier which is mounted directly on the axle is chambered at $7^b$ to accommodate the part $6^a$ for the small sun wheel 6 which is confined between this part of the carrier and the gear actuating collar $2^c$ and must therefore move with the rest of the gear when the latter is moved in either direction.

The right hand part 8 (Figure 11) of the planet carrier is formed with dogs $8^b$ adapted to engage with similar dogs $4^a$ on the inner end of the driving member 4 which carries the sprocket $4^b$. (Figure 16.)

The left hand part 7 (Figure 8) of the planet carrier is provided with ratchet teeth $7^c$ adapted to be engaged by the pawls $3^c$ on the hub cap $3^a$.

Figure 16:
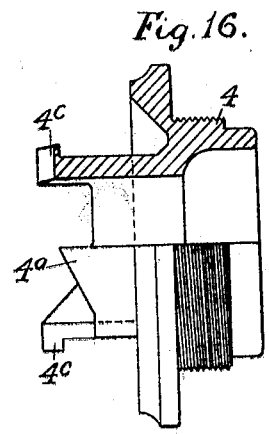
Figure 16 is a half-sectional detail view of the driving member which carries the sprocket wheel.

The annulus 11 (Figure 15) like the large sun wheel, is formed with a right hand extension $11^a$ which is provided exteriorly with ratchet teeth $11^b$ for engagement by the pawls $3^d$ on the hub cap $3^b$ and interiorly with elongated dogs 11ᶜ adapted to engage shorter dogs 4ᶜ on the outside of the inner end of the driving member 4 (Figure 16).

The annulus is tapped internally at its left hand end to receive a locking plate 11ᵈ which overlaps the marginal edge of the left hand part 7 of the planet carrier and ensures the annulus moving with the gear when the latter is moved to the left.

As already stated, the intermediate member of the gear comprising the sun wheels, planets and annulus, is movable bodily along the axle to effect the various changes in the speed ratio between the driving member 4 and the driven member or hub 3. This movement as will be understood is effected by means of the gear actuating pin 2ᵇ and its collar 2ᶜ. The mechanism employed for moving the actuating pin 2ᵇ in its slot 2ᵃ in the axle may be in all respects similar to that already in use in connection with three-speed gears, and is shewn in Figures 17 and 18 where it will be seen that the gear actuating pin 2ᵇ is mounted loosely on a gear actuating rod 13 which traverses the bore of the axle 2 and for convenience of manufacture and assembly is preferably made into two parts having a screwed connection at or about its middle. One end of this rod is adapted for connection by a short chain 14 to a cable and change speed lever which is arranged on the machine in a convenient position for the rider and works in a suitably notched quadrant. The said rod 13 is free to slide to and fro within the axle and is provided at its other end with a fixed head 13ᵃ.

The actuating pin 2ᵇ is not operated positively in either direction by the rod 13 but by means of coiled compression springs 15, 16 arranged around the rod within the axle one at each side of the said pin.

The left hand spring 15 abuts at one end against the actuating pin 2ᵇ and at the other end against the head 13ᵃ on that end of the rod, and keeps the said pin in contact with a shoulder 13ᵇ on the rod. The right hand spring 16 abuts at one end against the said shoulder and at the other end against a bush 17 which is screwed into the axle.

The operation of this gear actuating mechanism is such that when the actuating rod 13 is positively pulled to the right by means of the change speed lever operating through the chain and cable the two springs are compressed by the head 13ᵃ and shoulder 13ᵇ respectively. The compression of the left hand spring tends to move the gear actuating pin 2ᵇ along the rod to the right and this is permitted to the required extent by the corresponding simultaneous compression of the right hand spring 16. When it is desired to move the gear actuating pin to the left the change speed lever is released and moved back to the required notch. This allows both springs to expand and to force the rod 13 and therefore the pin, 2ᵇ, which as aforesaid is held against the shoulder 13ᵇ thereon by the spring 16 the requisite distance to the left.

Figure 1 shews the position of the parts for the intermediate or normal gear. In this position both sun wheels are free to rotate on the axle as also the planet carrier, the annulus being driven by the member 4 through the long and short dogs 11ᶜ, 4ᶜ and driving in its turn the hub 3 by means of the one way clutch 3ᵈ, 11ᵇ. This gives a direct drive.

To obtain the first or lowest speed the gear block is moved to its extreme limit toward the left, as seen in Figure 3.

In this position the annulus still remains in driven connection with the driving member 4 the dogs 11ᶜ being made sufficiently long for this purpose. The large sun wheel becomes locked from rotation by the engagement of the clutch members 5ᵇ thereon with the dogs 2ᵈ on the axle. At the same time driving connection is established between the carrier and the hub by the one way clutch 3ᶜ, 7ᶜ. The small sun wheel still remains free to rotate on the axle. The drive therefore in this case is from the annulus to the planet carrier by way of the smaller pinions and thence to the hub the resistance of the drive being taken by the now stationary large sun wheel. This gives the greatest amount of reduction obtainable through the gear.

From this position the second lowest gear is obtained by moving the intermediate gear member bodily one step toward the right. In this position the planet carrier and annulus still remain in engagement with the hub and driving member respectively but the smaller sun wheel is now in position for engagement with the axle, the larger sun wheel being freed. The drive in this case is the same as before except that it operates through the larger pinions and thus gives a less degree of reduction. The tendency of the smaller sun wheel in taking the driving resistance is to rotate in a backward direction and this it is free to do until one of the pawls thereon engage with one of the recessed abutments 2ᶠ in the axle. There being two of these abutments the maximum amount of backward lost motion of the small sun wheel can never exceed half a revolution.

The next progressive position of the gear gives the normal, third or direct drive already described.

To secure the fourth or lower high gear the intermediate gear member is moved further toward the right into the position shewn in Figure 9. In this position the drive is taken from the driving member 4 by the planet carrier and operates through the larger planet pinions which drive the annulus and hence the hub at a higher degree of rotation, the smaller sun wheel being prevented from rotation by the other pawl 6$^b$ engaging one of the other pair of recessed abutments 2$^g$ in the axle.

For the fifth, or highest gear, the intermediate gear member is moved for the remaining portion of its travel to the right the effect of which is to free the small sun wheel 6 and to lock the large sun wheel to the axle by the dogs 2$^e$ and clutch members 5$^b$, the annulus and planet carrier engagement with the hub and driving member respectively remaining unaltered. In this case the drive as before is taken from the driving member 4 by the planet carrier but now operates through the small planet pinions 10 which drive the annulus and hence the hub, through the one-way clutch 3$^d$, 11$^b$, at the highest speed obtainable through the gear.

Figure 21 shews a construction in which compound planet pinions are employed. In this figure the gear is shewn in the fourth speed position the small sun wheel 6 being locked to the axle by means of the dogs 2$^j$ thereon. The drive in this case is taken from the member 4 by the carrier 7, 8 and operates through the compound planet pinions acting in conjunction with the small sun wheel 6 to drive the annulus which in turn drives the hub through the one way clutch 11$^e$, 3$^e$.

As in the previously described construction the other speeds are obtained by moving the intermediate gear member to the left if a reduction is required and to the right for the higher speeds.

In the low speed position, that is to say, when the intermediate gear member is moved to the extreme left the large sun wheel 5 is locked from rotation by 5$^c$ pawls thereon engaging recessed abutments 2$^h$ in the axle. In this case the small sun wheel 6 being free, the drive is from the member 4 to the annulus 11 and operates through the compound planet pinions 9, 10 in conjunction with the large sun wheel 5, to rotate the planet carrier 7, 8 which in turn drives the hub 3 by means of a one-way clutch constituted by pawls 6$^e$ on the carrier and by ratchet teeth 3$^f$ in the hub.

In the second speed position the large sun wheel 5 is free and the small sun wheel 6 locked to the axle by the second set of dogs 2$^i$ and clutch members 6$^f$ so that the gear now operates through the compound planet pinions acting in conjunction with the small sun wheel thereby rotating the carrier and hence the hub at a higher speed.

In the intermediate or third speed position both sun wheels 5, 6 are loose and the planet carrier 7, 8 and the annulus 11 each driven by the driving member 4 so that the intermediate gear member rotates en masse and drives the hub 3 through a one-way clutch constituted by pawls 11$^e$ on the annulus and the ratchet teeth 3$^e$ on the inside of the hub shell.

In the fifth or highest speed position advantage is taken of the slot 2$^a$ in the axle to form an abutment for the pawls 5$^c$ on the large sun wheel 5 which is thereby locked from rotation, the small sun wheel 6 being free. The drive in this case is the same as for the fourth speed except that it operates through the compound planet pinions acting in conjunction with the large sun wheel 5 so that the annulus 11 and hence the hub 3 is thereby driven at a proportionately higher speed.

When the intermediate gear member is in the fourth and fifth speed positions it must be remembered that the annulus is rotating at a higher speed than the carrier hence the pawls 6$^e$ on the latter are over-run during these speeds by the ratchet teeth 3$^f$ on the hub.

It will of course be understood that the present invention may also be applied to other classes of mechinery in which case the sprocket member or its equivalent is suitably connected with the driving shaft or other member of the machine and the hub equivalent with that part of the machinery which is to be driven at the varying speeds.

We claim:—

1. A five speed gear for bicycles and machinery comprising a driving member, a driven member, a fixed member, an intermediate gear member slidably mounted as a single unit on the fixed member and comprising two epicyclic gear trains of different ratios the various elements of which are adapted for selective engagement with the said driving, driven and fixed members, and means for sliding said intermediate gear member along the fixed member.

2. A five speed gear for bicycles and machinery comprising a driving member, a driven member, a fixed member, an intermediate gear member slidably mounted on said fixed member within the driven member and comprising two epicyclic gear trains of different ratios of which the sun wheel in each train is rotatably mounted on said fixed member, and means for establishing selective engagement between the various elements of the intermediate gear member and the driving, driven and fixed members.

3. A five speed gear for bicycles and machinery comprising a driving member, a driven member, a fixed member, an intermediate gear member slidably mounted as a single unit on the fixed member and comprising two epicyclic gear trains of different ratios the various elements of which are severally arranged and adapted to engage with and disengage from the driving, driven and fixed members in the proper sequence during the movement of the intermediate gear member along the fixed member and means for effecting such movement.

4. A five speed gear for bicycles and machinery comprising a stationary axle, driving and driven members independently rotatable thereon, an intermediate gear member slidably mounted as a single unit upon said axle within the driven member and comprising two epicyclic gear trains of different ratios of which the various elements are adapted for selective engagement with the driving and driven members and with the axle, and means for operating said intermediate gear member.

5. A five speed gear for bicycles and machinery comprising driving and driven members each having two series of clutch parts, a fixed axle having four series of clutch parts, an intermediate gear member slidably mounted as a single unit on said axle and comprising two epicyclic gear trains of different ratios in which the planet carrier and annulus are common to both trains and have each two series of clutch parts respectively adapted in each case for engagement with the clutch parts on the driving and driven members, and in which the two sun wheels which are normally free to rotate on said axle are severally prevented from rotation by one or other of the four series of clutch parts thereon and means for operating said intermediate gear member substantially as described.

6. A five speed gear for bicycles and machinery comprising a driven member carrying two internal sets of pawls, a driving member having two sets of dog clutch parts, a hollow fixed axle carrying four series of clutch parts, an intermediate gear member slidably mounted on said axle within the driven member and comprising two epicyclic gear trains of different ratios in which the planet carrier and annulus are common to both trains and have each a series of ratchet teeth adapted for engagement by said pawls and a set of dog clutch parts adapted for engagement with the corresponding dog clutch parts on the driving member and in which the two sun wheels which are normally free to rotate on said axle and have each one set of clutch parts are adapted to be locked from rotation by one or other of the four series of clutch parts on said axle and mechanism passing through said hollow axle for operating the intermediate gear member.

7. A five speed gear for bicycles and machinery comprising driving and driven members each having a plurality of clutch parts, a fixed axle having a plurality of clutch parts, an intermediate gear member slidably mounted on said axle as a single unit and comprising two sun wheels of different diameters rotatably mounted on said axle and each having a series of clutch parts adapted for engagement with one or other of the clutch parts on the axle, a rotatable planet pinion carrier having a plurality of clutch parts respectively adapted for engagement with certain of the clutch parts on the driving and driven members, planet pinions of different diameters independently mounted in said carrier and in constant mesh respectively with said sun wheels, and an annulus common to all of said pinions and having a plurality of clutch parts respectively adapted for engagement with the other clutch parts on the driving and driven members, and mechanism for moving said intermediate gear member bodily along the axle according to the speed required.

JOHN JAMES HENRY STURMEY.
WILLIAM JOHN PEART.